US010467424B2

(12) United States Patent
Mani et al.

(10) Patent No.: US 10,467,424 B2
(45) Date of Patent: Nov. 5, 2019

(54) FILE SYSTEM CONTENT BASED SECURITY (71) Applicant: International Business Machines Corporation, Armonk, NY (US)

(72) Inventors: Anbazhagan Mani, Bangalore (IN); Sandeep Patil, Pune (IN); Sasikanth Eda, Vijayawada (IN); Dileep Dixith, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 15/730,794

(22) Filed: Oct. 12, 2017

(65) Prior Publication Data
US 2019/0114440 A1    Apr. 18, 2019

(51) Int. Cl.
| | |
|---|---|
| *G06F 16/178* | (2019.01) |
| *G06F 21/62* | (2013.01) |
| *G06F 16/27* | (2019.01) |
| *G06F 16/182* | (2019.01) |
| *G06F 3/06* | (2006.01) |
| *G06F 21/44* | (2013.01) |
| *G06F 21/60* | (2013.01) |
| *H04L 29/06* | (2006.01) |
| *H04L 29/08* | (2006.01) |

(52) U.S. Cl.
CPC .......... *G06F 21/6218* (2013.01); *G06F 3/065* (2013.01); *G06F 16/1787* (2019.01); *G06F 16/1844* (2019.01); *G06F 16/27* (2019.01); *G06F 21/44* (2013.01); *G06F 21/604* (2013.01); *H04L 63/20* (2013.01); *H04L 67/1095* (2013.01)

(58) Field of Classification Search
CPC .............................. G06F 16/178; G06F 16/219
See application file for complete search history.

(56) References Cited

U.S. PATENT DOCUMENTS

| | | | | |
|---|---|---|---|---|
| 6,101,585 | A | * | 8/2000 | Brown ................ G06F 11/1451 711/162 |
| 9,069,599 | B2 | | 6/2015 | Martinez et al. |
| 9,424,437 | B1 | | 8/2016 | Ancin et al. |

(Continued)

FOREIGN PATENT DOCUMENTS

| | | |
|---|---|---|
| CN | 101567858 A | 10/2009 |
| CN | 101702732 A | 5/2010 |

(Continued)

OTHER PUBLICATIONS

Written Opinion of the International Searching Authority for International application No. PCT/IB2018/057213, authorized officer: Mei Ming, dated Jan. 21, 2019, 3 pages. (Year: 2019).*

(Continued)

*Primary Examiner* — Ponnoreay Pich
(74) *Attorney, Agent, or Firm* — Nolan M. Lawrence (57) ABSTRACT

A filesystem command is sent by a first processor, and for synchronization by a second processor. The filesystem command is directed to a second object of a second filesystem that is synchronized with a first object of a first filesystem. An expression is sent by the first processor to the second filesystem, and for authentication by the second processor. The expression is generated based on a third object of the first filesystems that is synchronized with a fourth object of the second filesystem.

20 Claims, 6 Drawing Sheets

(56) References Cited

U.S. PATENT DOCUMENTS

| | | | |
|---|---|---|---|
| 9,507,795 B2 | 11/2016 | Dorman et al. | |
| 2002/0049579 A1* | 4/2002 | Gates | H04L 29/12141 704/1 |
| 2002/0083083 A1* | 6/2002 | Smith | G06F 16/178 |
| 2002/0133515 A1* | 9/2002 | Kagle | G06F 17/24 715/256 |
| 2009/0150569 A1* | 6/2009 | Kumar | G06F 16/178 709/248 |
| 2009/0271779 A1* | 10/2009 | Clark | G06F 8/71 717/171 |
| 2015/0169717 A1 | 6/2015 | Wang et al. | |
| 2015/0317213 A1* | 11/2015 | Lin | G06F 11/14 707/679 |

FOREIGN PATENT DOCUMENTS

| | | | |
|---|---|---|---|
| CN | 101706802 A | 5/2010 | |
| CN | 103649946 A | 3/2014 | |
| WO | 2014047384 A2 | 3/2014 | |

OTHER PUBLICATIONS

Mell et al., "The NIST Definition of Cloud Computing", Recommendations of the National Institute of Standards and Technology, Sep. 2011, 7 pages.

International Search Report and Written Opinion, dated Jan. 21, 2019, International Application No. PCT/IB2018/057213, 9 pages.

* cited by examiner

FILE SYSTEM CONTENT BASED SECURITY

BACKGROUND

The present disclosure relates to file systems, and more specifically, to utilizing files to bolster file synchronization security.

File synchronization may be used in commercial enterprises to provide access to files through a variety of geographic locations. File synchronization may be used in a private setting to provide end users with access to files on a plurality of devices or through a multitude of clients. File synchronization may be used for medical purposes to provide archives and backups of critical patient information. File synchronization may be used in disaster recovery situations to maintain data across locations in case one location is subject to a tornado, earthquake, flood, or other natural disaster.

SUMMARY

According to embodiments of the present disclosure, aspects may include a method, a system, and a computer program product. A filesystem command is sent by a first processor, and for synchronization by a second processor. The filesystem command is directed to a second object of a second filesystem that is synchronized with a first object of a first filesystem. An expression is sent by the first processor to the second filesystem, and for authentication by the second processor. The expression is generated based on a third object of the first filesystems that is synchronized with a fourth object of the second filesystem.

Also according to embodiments of the present disclosure, aspects may include a tiering filesystem. The tiering filesystem comprising a first memory, a first storage device, and a first processor. The first storage device containing a first filesystem of one or more first-filesystems objects. The first processor communicatively coupled to the first memory and the first storage device. The first processor receives a first filesystem command. The first processor detects that the first filesystem command is directed to a first object of the first filesystem synchronized with a second object of a second filesystem. The first processor retrieves one or more authentication credentials based on the detection. The first processor identifies that the first filesystem access command is a delete command. The first processor generates a linguistic expression related to the first filesystem based on the identification. The first filesystem provides the linguistic expression to the second filesystem. The first filesystem provides the authentication credentials to the second filesystem. The first filesystem provides a second delete command to the second filesystem.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to file systems, more particular aspects relate to utilizing files to bolster file synchronization security. While the present disclosure is not necessarily limited to such applications, various aspects of the disclosure may be appreciated through a discussion of various examples using this context.

File systems (also referred to as, filesystems) are a critical portion of computing in the modern world. File systems are where information and data relating to a computer system are stored long-term. Files on the computer system may be critical to usage in all aspects of computing. In some cases, individuals store photographs of friends and family on the filesystem. In other cases, years of scientific research or interesting advancements and discoveries are stored in various files and folders of a computer system. In yet other cases, the products of modern work, such as various marketing documents, writing documents, or image documents that are labored upon for compensation are stored in file systems.

As the Internet has become ubiquitous, filesystems have grown to support always-connected lifestyles. Users expect that the devices they use and the content stored upon them can be available in many places. Computer hardware and software manufactures have created various connected services to accommodate these use cases. In some situations, computing devices provide seamless integration of cloud-hosted files. The cloud-hosted files may be in the form of a portal or cloud interface that allows direct viewing and access of the files stored on a remote server. The cloud-hosted files may be interacted with in the form of a tiered configuration where some files are stored locally and where others are stored remotely (e.g., cloud tiering or cloud-as-tier). The tiering provides increased flexibility for device storage capacity as a network-accessible device can store only a subset of data locally while seamlessly providing for the viewing and accessing other subsets of data that are stored remotely.

Another advantage of filesystems is in the form of data redundancy (i.e., data backups or filesystem backups). Filesystem backups provide enhanced protection from data losses to users of computers. In some cases, a user of a computer may leverage a backup to be able to restore information from a previous state in the advent of a damaging component failure of the computer. Cloud-based filesystems may be leveraged to provide filesystem backups remotely across networks or the Internet. In some cases, a user of a computer may be empowered by backups utilizing cloud-based filesystems and may take a computing device to a hazardous environment such as on a sea vessel with increased assurances that the user's data may be safely backed up.

Both cloud-based file systems and backups utilize file synchronization. In file synchronization, data integrity is paramount to a functioning system. In certain situations, file synchronization suffers from many technical issues due to managing multiple file systems. File synchronization operates in part through transactions—by receiving updates to data on one device that maintains a copy of the filesystem. In some cases, the updates could be directed from a user of the cloud-based filesystem. In some cases, the updates could be directed from one of the devices that make up part of the cloud-based filesystem. File synchronization systems attempt to ensure that transactions maintain data integrity. In some cases, any updates that come across need to be verified that they are proper updates. In some cases, issues could stem from nefarious third parties intercepting the transactions. The third parties may try to spoof commands and, consequently, each file synchronization command may need to be validated.

Content-based security factors (CSF) may provide technical improvements to file synchronization systems. CSF may enable the content synchronized by the file synchronization system to be used as a primary or secondary authentication factor. CSF may utilize an expression generated based on the content synchronized by the filesystem. CSF may improve two-way file synchronization systems, such as cloud-based file systems. CSF may improve one-way file synchronization systems, such as file backups. CSF may improve the operation of file synchronization by providing additional security factors to strengthen security.

The additional security of CSF allows certain transactions of existing file synchronization systems to be automated. For example, these automated transactions could include content updates to a first file system being kept in synch with a second file system as a result of synchronized commands issued by one of the file systems. Using an inotify mechanism (e.g., light weight events) could allow for monitoring of commands to one filesystem in a file synchronization system. The inotify mechanism could allow a system to automate the delete command generation and transmission for synchronizing one filesystem with other filesystems in a file synchronization system. In some cases, because delete commands could have irreversible effects, some file system administrators are reluctant to automate the delete command transactions sent to a remote filesystem. The enhanced security provided by CSF may enable the automating of the delete commands (or any other transactions) while maintaining the security and integrity of the filesystems.

CSF may operate utilizing the very content that is synchronized. CSF may provide increased performance through compatibility. For example, each synchronous filesystem regardless of format or convention has synchronized content. Throughout the disclosure, embodiments may utilize a variety of terms for use in describing the content that is synchronized. Illustratively, the following disclosure may discuss the variety of terms and names that may be used, interchangeably, in the discussion of synchronizing content. It should be appreciated that the terms are utilized for example purposes and that other terms in the field may be utilized to convey the embodiments of the disclosure. Internet service providers (ISPs) may provide one or more of the computing services (e.g., processor, memory, APIs, networking, etc.) that facilitate the synchronization of various filesystems. Certain ISPs may use a variety of terms for the files that are synchronized, such as object or blob. A variety of terms may be used for the folders that are synchronized (e.g., directories, containers, buckets, etc.). A variety of terms may be used for the accounts that are associated with users of the filesystem, such as domains or vaults. A variety of terms may be used for the metadata that are synchronized, such as tags or xattrs. "Metadata" may refer to any of multiple types of metadata (e.g., user metadata, system metadata). User metatdata may be metadata that a user specifically creates such as a description metadata field describing a folder using English words, phrases, and/or sentences. System metadata may be metadata that the system creates such as created date, last modified timestamp, or the like.

In a first example, a local computer may host a local filesystem that may contain one or more files in one or more directories (also referred to as, folders). A subset of files or folders may be tied to one or more accounts, and metadata or xattr may describe attributes of the files and/or folders. The local computer may be synchronized with, and in cooperation with, an Internet service provider (ISP) hosted at a remote location. The ISP may have, for each file, an object that is kept in sync with the file. The ISP may have, for each directory, a synchronized container. The ISP may utilize tags to describe various attributes of each object and container. The ISP may maintain a series of vaults that correspond to the accounts.

Figure 1:
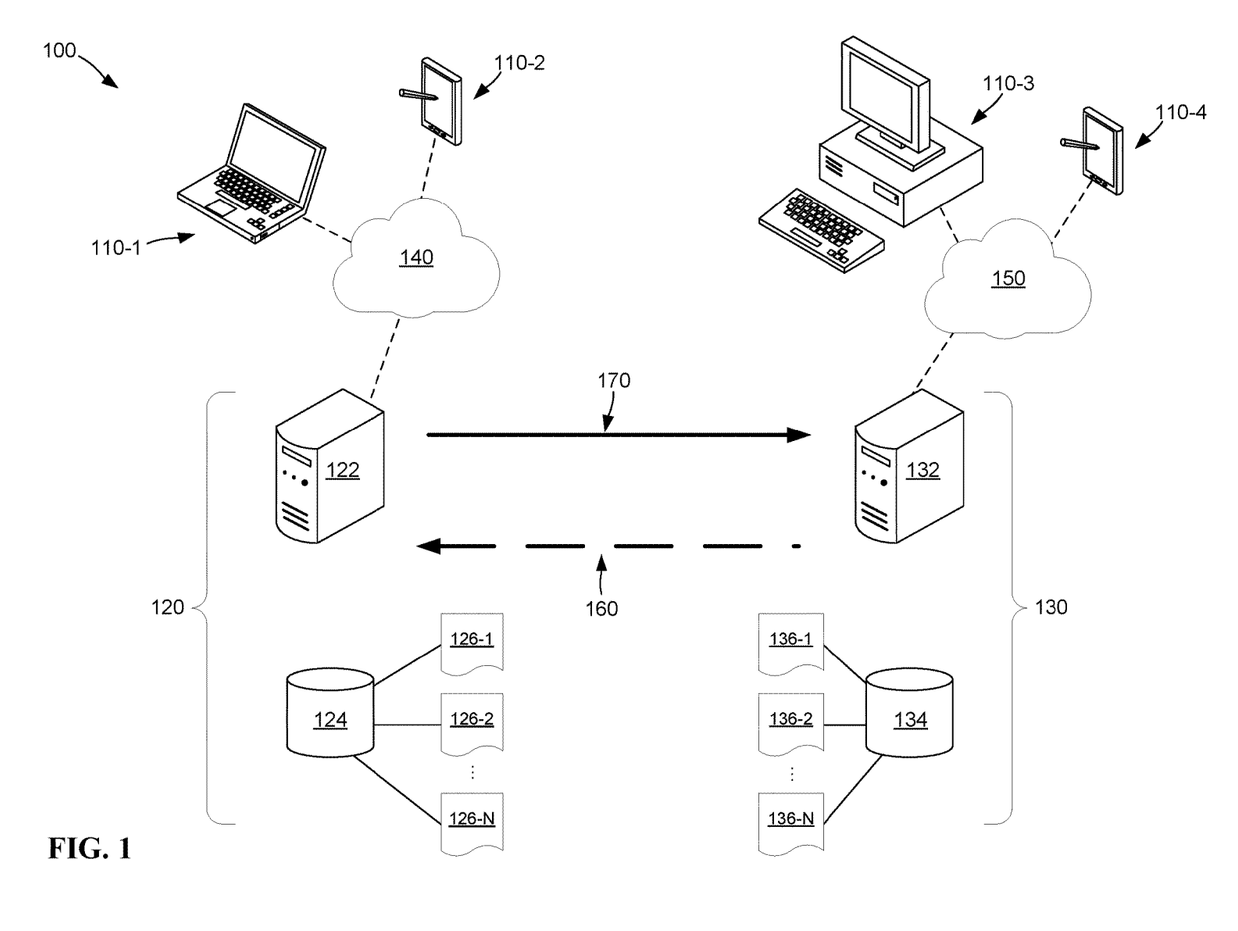
FIG. 1 depicts an example computing system utilizing file synchronization consistent with embodiments.

FIG. 1 depicts an example computing system 100 utilizing file synchronization consistent with embodiments. Computing system 100 may include one or more client devices 110-1, 110-2, 110-3, and 110-4 (collectively, 110). Computing system 100 may also include first file synchronization node 120 (also referred to as, local node) and second file synchronization node 130 (also referred to as, remote node). Computing system 100 may also include a local network 140 that communicatively couples the client devices 110-1 and 110-2 to the node 120. Computing system 100 may also include a remote network 150 and the second node 130. Additional networks (not depicted) may communicatively couple the local network 140 and the remote network 150 (e.g., a WAN, the Internet, etc.).

Figure 4:
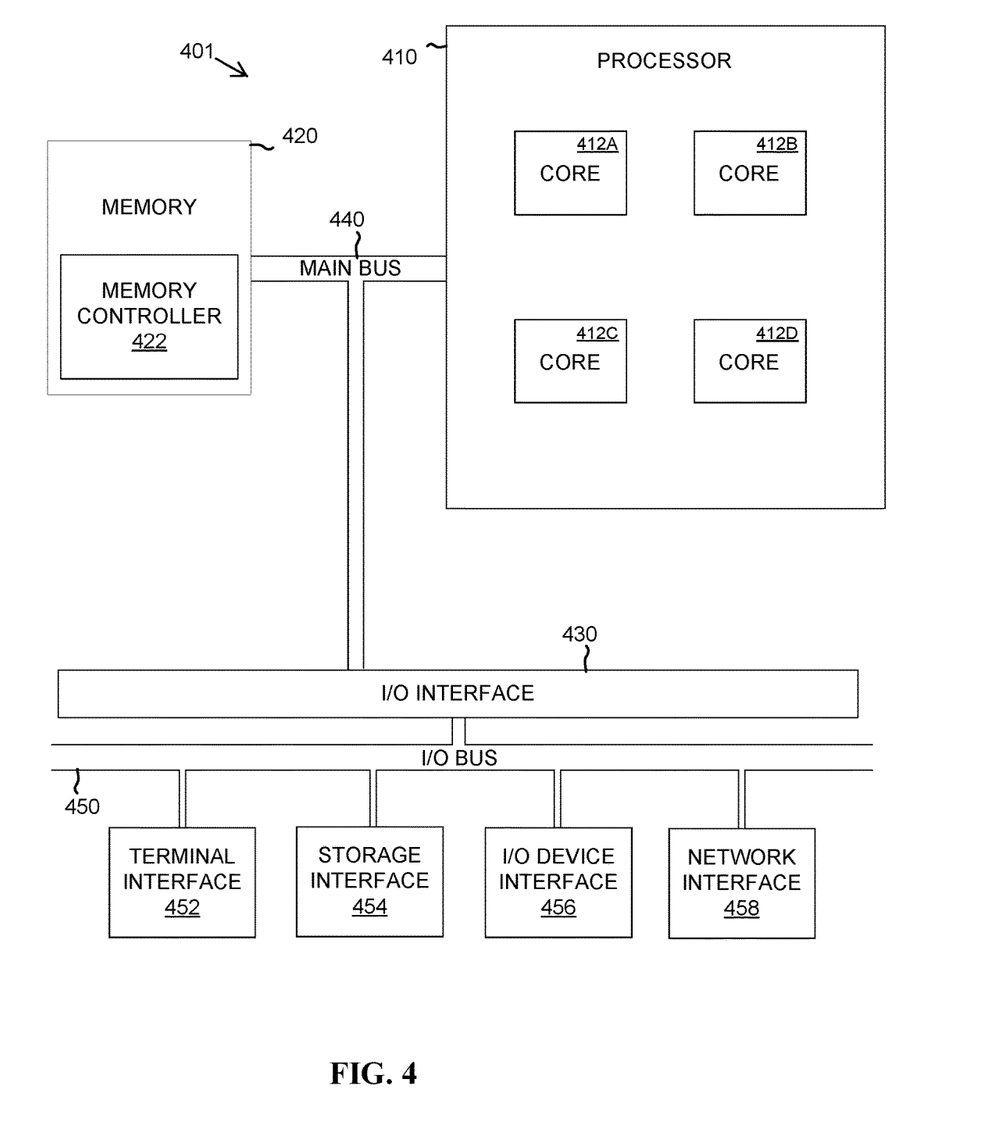
FIG. 4 depicts the representative major components of an example computer system that may be used in accordance with embodiments of the present disclosure.

Client devices 110 may include one or more computers and personal digital assistances (e.g., smartphones, tablets, portable computers, etc.). Each client device 110 may include a processor and memory. FIG. 4 may describe an example computer consistent with a given client device 110. Each client device 110 may operate by sending instructions to and from the file synchronization nodes 120 and 130. Each client device 110 may also operate by sending and receiving content from the file synchronization nodes 120 and 130. For example, client device 110-2 may send a command through network 140 to local file synchronization node 120. In a second example, client device 110-3 may receive an update of content through network 150 from remote file synchronization node 150. In some embodiments, the client devices may utilize the additional networks to issue commands. For example, client device 110-2 may utilize a wide area network (WAN) to issue commands to second file synchronization node 150.

First file synchronization node 120 may include a first server 122 and a first datastore 124. The first server 122 may be one or more computing devices and software services configured to maintain a first filesystem. The first server 122 may operate based on one or more requests from the client devices 110-1 and 110-2. The first server 122 may communicate with the client devices 110 through the network 140, network 150, or the Internet. The first server 122 may host a first filesystem synchronized with additional file systems (e.g., second file synchronization node 130).

The first datastore 124 may be one or more computers and storage devices configured to store data. For example the first datastore 124 may be a platter or disk based hard-drive in a server enclosure, or a solid-state hard-drive located within a server. The first datastore 124 may include one or more filesystems designed to store and organize files and folders (e.g., NTFS, FAT32, ZFS, etc.). The first datastore 124 may include one or more databases that store values. In some embodiments, the stored values may be related to the filesystems. The first datastore 124 may include a first set of objects 126-1, 126-2, through 126-N (collectively, 126). The first set of objects 126 may be the local files and folders of the filesystem. In some embodiments, all of the files and folders of the first file synchronization node 120 may be stored by the second file synchronization node 130. For example, the first file synchronization node 120 may be the filesystem of a mainframe server and remote backup of the data in the first datastore 124 may be mirrored by the second file synchronization node 130. Continuing the example, if in the event there is data loss at the first datastore 124, the second file synchronization node 130 may be utilized to rebuild the data for the mainframe server.

In some embodiments, only a subset of the files and folders of the filesystem may be stored by the first file synchronization node 124. For example in a tiering-based cloud service, a portion of the files and folders may be kept in the datastore 124. The portion of the files stored locally in the datastore 124 may be represented by files 126-1-126-4, 000. As the datastore 124 begins to run out of hard drive space, the first server 122 may decide that one or more files need to be stored at the remote synchronization node 130. First server 122 may direct files 126-4,001-126-32,547 to be stored by second synchronization node 130. First server 122 may create one or more stubs describing the files that are synchronized to second synchronization node 130. First server 122 may store information about the files stored in the second synchronization node 130 directly in the stubs (e.g., metadata that may speed up viewing of the files and folders in a file browser). First server 122 may store information about the files stored in the second synchronization node 130 indirectly in a stub—the stub may point to a database also stored in datastore 124 and information about the file stored in the second synchronization node may be retrieved through the link in the stub to the database.

Remote file synchronization node 130 may include a second server 132 and a second datastore 134. The second server 132 may be one or more computing devices and software services configured to maintain a second filesystem. The second server 122 may operate based on one or more requests from the client devices 110. The second server 132 may communicate with the client devices 110 through the network 150, network 140, or the Internet. The first server 132 may host a second filesystem synchronized of a plurality of additional file systems (e.g., first file synchronization node 120). The first server 132 may be located geographically distinct from the first server 122 and be operated by a different entity from the first file synchronization node 120. In some embodiments, the second server 132 may utilize certain security measures to protect the second datastore 134. For example, an ISP may host remote file synchronization node 130 and may utilize a username and/or password to authenticate access to the first server 132 and the remote file synchronization node.

The second datastore 134 may be one or more computers and storage devices configured to store data. For example the second datastore 134 may be a platter or disk-based hard-drive in a server enclosure, or a solid-state drive located within a server. In some embodiments, the second datastore 134 may include a plurality of data storage hardware (e.g., tapes, spinning platter drives, solid-state drives, ram based disks, stackable cross-gridded non-volatile memory, etc.). The second datastore 134 may include one or more filesystems designed to store and organize files and folders (e.g., NTFS, FAT32, ZFS, etc.). The second datastore 134 may include or may be configured to utilize one or more databases or filesystems that provide an emphasis on certain performance characteristics, such as capacity or access latency. The second datastore 134 may include a second set of objects 136-1, 136-2, through 136-N (collectively, 136). In some embodiments, the second datastore 134 may provide enough storage to have increased redundancy. For example, second datastore 134 may have a plurality of hard drives and second server 132 may make copies of the second set of objects 136 in multiple hard drives of the plurality of hard drives.

The second set of objects 136 may be direct copies or may directly relate to the first set of objects 126. For example, second datastore 134 may be a backup of datastore 134 and each object 136 may directly correspond to an object 126. In some embodiments, the second set of objects 136 may not be direct copies of first datastore 124 and second datastore 134 may data in a different format. For example, the second datastore 134 may be a series of blobs 136, and each blob may correspond to either a file or a folder of first datastore 124. In a second example, the second datastore 134 may have a series of objects and containers 136. In some embodiments, one or more attributes of the datastore 134 may be obfuscated so as to provide enhanced security. For example, the second set of objects 136 may be named in a serial fashion regardless of account or owner. Continuing the example, a data object 136-107 may have a serialized name of "43513209DFC2398" and may be related to a first account. Further continuing the example, a second data object 136-108 may have a serialized name of "43513209DFC2399" and may be related to a second account.

The computing system 100 may provide for a variety of security measures to secure the data objects 126 and 136. The client devices 110 may utilize the local file synchronization node 120 and the remote file synchronization node 130 to access the data objects 126 and 136. In some embodiments, the computing system 100 may utilize an authentication factor such as a user name and password. For example, client device 110-3 may include a plurality of files and folders locally and may also include a plurality of file stubs representing files that have been tiered to the computing system 100. Client device 110-3 may request a folder that is associated with an example stub and may be further associated to object 136-1. To permit access to the actual folder by way of synchronization through network 150, server 132 may respond with object 136-1 only based on receipt, from client device 110-3, of a user name and password.

In some embodiments, computing system 100 may utilize content-based security factors (CSF) for securing access to data objects 126 or 136. A first example consistent with embodiments of CSF is now described. Client device 110-1 may be connected to network 140 to connect to first datastore 124 through first server 122. A user may use a file browser executed by an operating system of client device 110-1. The file browser may mount a filesystem hosted on first datastore 124 through a series of requests between client device 110-1 and first server 122. As a user views and updates files from client device 110-1 the files and folders stored in first datastore 124 may be updated by first server 122.

Continuing the first example, first synchronization node 120 may perform tiering synchronization with second synchronization node 130. First server 122 of first synchronization node 120 may determine that one or more files and folders 126 should be tiered to second synchronization node 130. The determination may be based on a file 126-8 being a stub. First server 122 may perform a synchronization operation at 170. The determination and operation 170 may be automated as a daemon or system level framework (e.g., inotify, light weight events policy, etc.). The operation 170 may be transmitting an update to file 126-8 to second server 132. The operation 170 may include transforming the update to file 126-8 into an object 136-8. The object 136-8 may be in a format that is unreadable without access to file stub 126-8 and related databases stored in datastore 124. The operation 170 may also be transmitting a CSF to second server 132. The CSF may be an expression that describes a synchronous attribute—an attribute that is synchronized between the first file synchronization node 120 and the second file synchronization node 130. A synchronous attribute may include any of the following: a file, a folder, metadata of a file, metadata of a folder, account information related to a file, account information related to a folder, etc. A synchronous attribute may further include any of the following: a size of a file or folder, a number of files or folders, a relationship between files or folders (e.g., there are twelve files in folder 'Program Files', file X is the second largest file in folder Y, etc.).

Continuing the first example, at operation 170 the first server 122 selects an attribute of datastore 124 regarding folder 126-137,023 and files 126-138,110, 126-138,111, and 126-138,112 (the three files located in folder 126-137,023). The first server 122 selects folder 126-137,023 and files 126-138,110, 126-138,111, and 126-138,112 because they are stubs stored in datastore 124 and synchronized with corresponding container 136-140,111 and objects 136-140, 112, 136-140,113, and 136-140,114. At operation 170 the first server 122 may generate the following expression: "file 126-138,111 was last modified later than files 126-138,110 and 126-138,112."

Continuing the first example, at operation 170 the first server 122 may transmit the CSF to second file synchronization node 130. In some embodiments, operation 170 may be accompanied by optional operation 160. Optional operation 160 may be a prompt by second server 132 to request the CSF for authentication. Optional operation 160 may be a confirmation of receipt and performance of synchronization by second server 132. Optional operation 160 may be a confirmation of successful authentication via CSF received at 170. In some embodiments, the CSF may be a secondary authentication factor and performance of operation 170 may include transmission of a first authentication factor (e.g., a username and password) as well as the CSF (e.g., the expression of the synchronized content of the filesystems). The performance of operation 170 may be in the form of a filesystem APIs (e.g., get( ), put( ), update( ), delete( )). In some embodiments, the performance of operation 170 may be in the form of server-client model protocols, such as REST operations (e.g., create, update, read, delete).

Continuing the first example, upon receipt of the transmitted synchronization update and the authentication through the CSF, at 170, the second server 132 may perform the synchronization. In detail, the second server 132 may store the received synchronization update in a cache of update commands to be processed in the order received. The second server 132 may authenticate the expression of the received CSF by comparing the expression to the container 136-140,111 and objects 136-140,112, 136-140,113, and 136-140,114. If the object 136-140,113 was last modified later than objects 136-140,112 and 136-140,114, the synchronization command received at 170 may be authenticated. If the synchronization command received at 170 is authenticated, then object 136-8 may be updated. The utilization of the CSF may improve performance of file synchronization as compared to other security methods. For example, utilizing the content synchronized between the first datastore 124 and the second datastore 134 may reduce memory utilization by eliminating the dependence on additional dedicated authentication credentials, which are often storage intensive. In another example, utilizing the content synchronized between the first datastore 124 and the second datastore 134 may reduce processing overhead as additional dedicated authentication credentials, that are often mathematically intensive, need not be generated.

A second example consistent with embodiments of CSF may now be described. A file synchronization operation may be initiated based on an update from second file synchronization node 130. Prior to the synchronization operation a delete command may be issued by a client device 110-4 and directed to an object 136-137,189 of second datastore 134. Object 136-137,189 may have an object identifier "AD23420381DJL17-38322A". Second server 132 may generate a CSF expression from datastore 134. The CSF expression may be of content owned by the same party as the party that owns object 136-137,189. In some embodiments, the CSF expression may be of content owned by an entity other than the party that owns object 136-137,189. Upon receipt of the command and the CSF the first server 122 may update object 126-137,189. Object 126-137,189 may be a file belonging to a first user.

Continuing the second example, the format of the command sent from the second file synchronization node 130 to the first file synchronization node 120 may be as follows: "curl -X DELETE -H "Content-Length: 256" -h "X-Token: abc123pqrs" -H "X-OBJ-UUID: AD23420381DJL17-38322A". The CSF expression may be "Is JK12425261DIL17-2243K2 43,781,235 bytes?" and may be in the form of a question. The computer system 100 may rotate expressions to prevent repeating the same expressions. In some embodiments, the computer system 100 may prevent reuse of CSF expression by placing them into a recently used list. The file synchronization nodes 120 and 130 may generate a CSF by ensuring the expression is not on the list. In some embodiments, the list may be culled periodically (e.g., by removing the oldest entries into the list every thirty days, by deleting all entries older than one week every day, etc.).

In some embodiments, the computer system 100 may provide enhanced performance compared to other file synchronization nodes that do not utilize CSF. A third party could intercept and view the commands sent between the file synchronization nodes 120 and 130. For example, a bad actor may monitor the delete commands sent from the second file synchronization node 130 to the first file synchronization node 120 as they are sent through the Internet. The bad actor may alter the delete command by adjusting the X-OBJ-UUID of the delete command (e.g., from prior example "AD23420381DJL17-38322A" could be changed to "AD23420381DJL17-38322B" which may be associated with another file). The bad actor, however, could not convince one or the other of the file synchronization nodes 120 and 130 to complete the delete command, because it would not be able to provide an expression regarding the synchronous content. As the filesystem content that is being synchronized is constantly changing, the computer system 100 may provide enhanced security over fixed keys. Even if a bad actor could obtain access to one CSF expression it would be irrelevant either because the content has changed or because the CSF expression is not reused.

Figure 2:
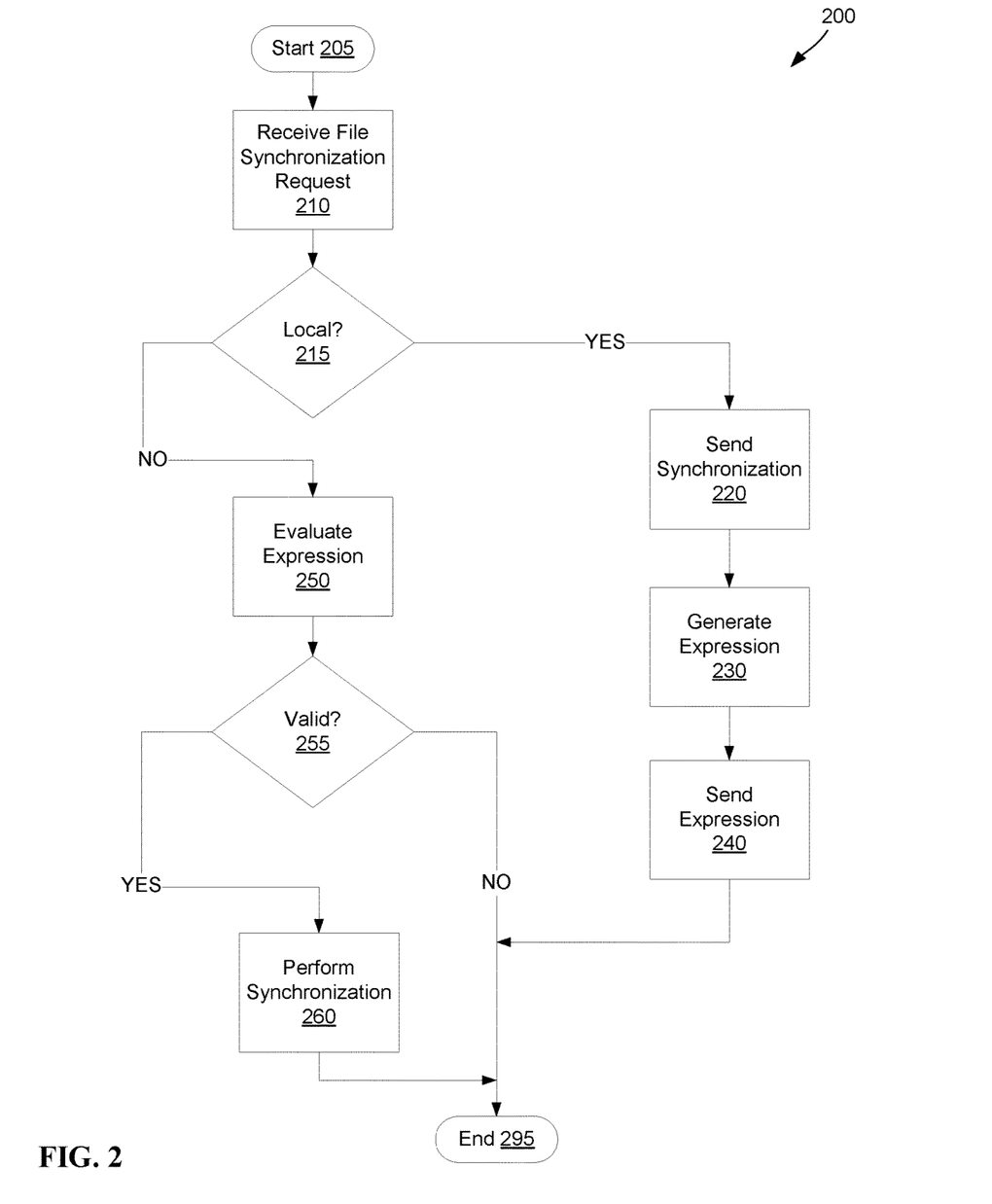
FIG. 2 is a flow diagram of a method for synchronizing a file system based on the synchronized content, consistent with embodiments.

FIG. 2 is a flow diagram of a method 200 for synchronizing a file system based on the synchronized content, consistent with embodiments. Method 200 may be performed by a filesystem server or data server in a file synchronization system. Method 200 may include more or less operations than is disclosed herein. Some operations may be performed continuously or periodically. For example, operations 210 may be performed, illustratively, every second, every three seconds, or every sixteen milliseconds. Some operations of method 200 may be combined or separated. As certain file synchronization systems may include a plurality of servers, some operations of method 200 may be performed by a first server and other operations may be performed by a second server. In some embodiments, method 200 may be performed in parallel by a plurality of servers of a file synchronization system.

From start 205, one or more file synchronization requests may be received at 210. The file synchronization requests may include a command to update one or more values on one filesystem in the file synchronization system. For example a client device connecting through a network share may update one or more values. In some embodiments, the file synchronization request may be made directly or as part of a local operation. For example a user of a desktop computer may update one or more files locally on a hard drive communicatively coupled to and physically located inside the desktop computer. The updated local files may be in a filesystem of the hard drive that is part of the file synchronization system. A daemon or job executing on the desktop computer may generate the file synchronization request at 210 after updating the local data. In some embodiments, the file synchronization request may be made indirectly or from an operation initiated from a remote node. For example, after an update is performed on a remote node of a file synchronization system a request may be received to perform a synchronization on a local drive.

If the synchronization is a locally initiated synchronization, at 215, a synchronization update may be sent to other nodes in the file synchronization system at 220. For example, a second file synchronization server may send, at 220, a command to update a first text file that was updated by a user of the second file synchronization server to a first file synchronization server. Multiple synchronization updates may be sent at 220. For example, a given file synchronization system may include seven file systems that are kept in synchronization with each other. Continuing the example, a fifth file synchronization server may have updated a fifth file system object. Further continuing the example, six file system synchronization updates may be sent to file synchronization servers one, two, three, four, six, and seven at 220.

At 230 an expression may be generated for a content-based security factor (CSF). The expression generated at 230 may be utilized for authentication of the synchronization update sent at 220. The expression generated at 230 may describe one or more pieces of content in the synchronized filesystem. For example, in a file server backup containing a live server and a backup server, a piece of content that is in the live server may be backed up to the backup server, and any piece of content may be utilized to generate the expression at 230. The expression generated at 230 may be based on any direct content of the filesystem, such as a file and folder. The expression generated at 230 may be based on any indirect content of the filesystem—for example, content contained in metadata of a file or folder, or account information related to a file or folder. The expression generated at 230 may be based on multiple content items, such as a series of files or folders or a relationship between them. For example, a description of the most recently updated metadata of three files in synchronized filesystem.

The expression generated at 230 may be based on a predetermined template. The predetermined templates may be synchronized between all of the file synchronization nodes. In some embodiments, the predetermined template may be generated by a user of the CSF-based file synchronization systems consistent with the disclosure. For example, a series of templates are disclosed in Table 1.

TABLE 1

| "Is | <ACCT> | owner of bucket | <CONT> | ?" |
|---|---|---|---|---|
| "<ACCT> | Is | owner of object | <OBJ> | ." |
| "Is size of | <OBJ> | greater than | <VAL> | ?" |
| "Is | <OBJ> | greater in size than | <OBJ> | ?" |
| "<OBJ> | Is | updated more recently than | <OBJ> | ." |
| "<OBJ> | Is | updated less recently than any in folder | <CONT> | ." |

According to Table 1, various values retrievable by the CSF may be represented as follows: <ACCT> for accounts, domains, and vaults; <META> for metadata, tags, or xattr information; <CONT> for folders, directories, containers, or buckets; <OBJ> for objects, blobs, or files. Some values utilized may be represented with <VAL>. The values may be generated based on rounding down or up as necessary. The representations may be utilized by method 200 to select the proper content-based information to properly generate the CSF. In some embodiments, the CSF may include only natural language elements. For example, "'Jennifer" is the owner of object 'summer job.csv'.". In some embodiments, the CSF may also include tags. For example, "<ACCT>Jennifer</ACCT> is the owner of object <OBJ>summer job.csv</OBJ>.".

In some embodiments, there may be additional authentication keys utilized to supplement the CSF expressions. For example, there may not yet be many files or folders synchronized between the file synchronization nodes. There may not yet be much synchronous information because a backup is only beginning to be performed. There may not yet be much synchronous information because a first filesystem may be fairly empty and tiering of files to other file synchronization nodes may not be extensive. During initial setup of the file synchronization system additional authentication keys may be pregenerated and shared amongst the nodes of the file synchronization system. Generating the expression at 230 may include selecting a pregenerated key instead of generating an expression based upon the synchronous content. As the synchronization system reaches a certain number of content items that are synchronized between the nodes the pregenerated keys may be removed to save storage space. In some embodiments, the pregenerated keys may be removed upon the synchronization of 100 objects. In some embodiments, the pregenerated keys may be removed upon the synchronization of 12,000 objects.

In some embodiments, selection of the content used for the expression generation at 230 may be based on one or more factors of the file synchronization system. For example, to ensure the content of the expression is the same, the expression may be based on content that has not been recently synchronized. Continuing the example, if one or more items of synchronized content has been updated within the last twenty-four hours, it may not be selected. After the expression is generated at 230, the expression may be sent to the remote file synchronization node at 240. The expression may be sent to multiple remote file synchronization nodes at 240. After sending the expression at 240 method 200 may end at 295.

If the synchronization is a not a locally initiated synchronization (e.g., a remote initiation of synchronization), at 215, a received CSF based expression may be evaluated at 250. The expression may be evaluated at 250 based upon one or more templates shared between the nodes of the synchronized file system. The expression may be evaluated at 250 based on a natural language processing engine. In embodiments, where pregenerated keys are still utilized, evaluation of the expression at 250 may be based on the synchronized pregenerated keys. In some embodiments, the filesystem may cache one or more items of the synchronous content to ensure performance of the expression evaluation at 250. In a first example, a first object may be updated based on a prior synchronization operation and the state of the object before being updated would be placed into an update cache. The update cache may store the updates for a certain period of time. In some embodiments, the period of time may balance successful authentication of only valid transactions with the realities of a changing set of keys (i.e., the synchronous content of synchronized file systems). In a first example, the cache may be utilized for valid expression evaluations at 250 for transactions that are thirty minutes old. In a second example, the cache may be utilized for valid expression evaluations at 250 for transactions that are forty-five seconds old.

If the expression evaluates as a valid expression at 255 the synchronization operation may be performed at 260. Performance of the synchronization operation at 260 may include writing one or more values to a local filesystem or database contained in the recipient file synchronization node. For example, causing a disk controller to flip magnetic bits on one or more platters of the hard disk. After determining whether the expression evaluates as valid at 255 (or performing the synchronization operation 260), method 200 may end at 295.

In a first example, generating the expression at 230 may include selecting a first folder named "Henry Pictures" from among one or more content items from a first file system. The first folder may include one or more attributes including a first attribute. The first attribute indicates there are thirty-one files and folders inside of the first folder. A template entry indicating the number of content items in a folder is selected from a content table. The generating of the expression at 230 may result in a first expression. The first expression states "'31' items are located in folder 'Henry Pictures'?" The expression may be an expression that resolves to true upon inspection and comparison by a second file system.

In a second example, evaluating the expression at 250 may include comparing the content of a second file system to a received expression (e.g., the expression generated in the first example in the preceding paragraph. The expression states "'31' items are located in folder 'Henry Pictures'?" The expression may include a first item '31' and a second item 'Henry Pictures' and a body "_items are located in folder _?". The expression may have been received as part of the file synchronization request at 210. The evaluation may include retrieving one or more content items from the second file system. The expression is parsed using natural language processing to turn the first item and the second item into comparable elements. The evaluation may include retrieving all folders from the second file system and iterating over each folder until a match to "Henry Pictures" is found. Upon finding the matching folder in the second file system, a scan of attributes of the matching folder and attributes of the metadata related to the matching folder may evaluate the expression as true (i.e., that there are currently 31 items in the folder Henry Pictures).

Figure 3:
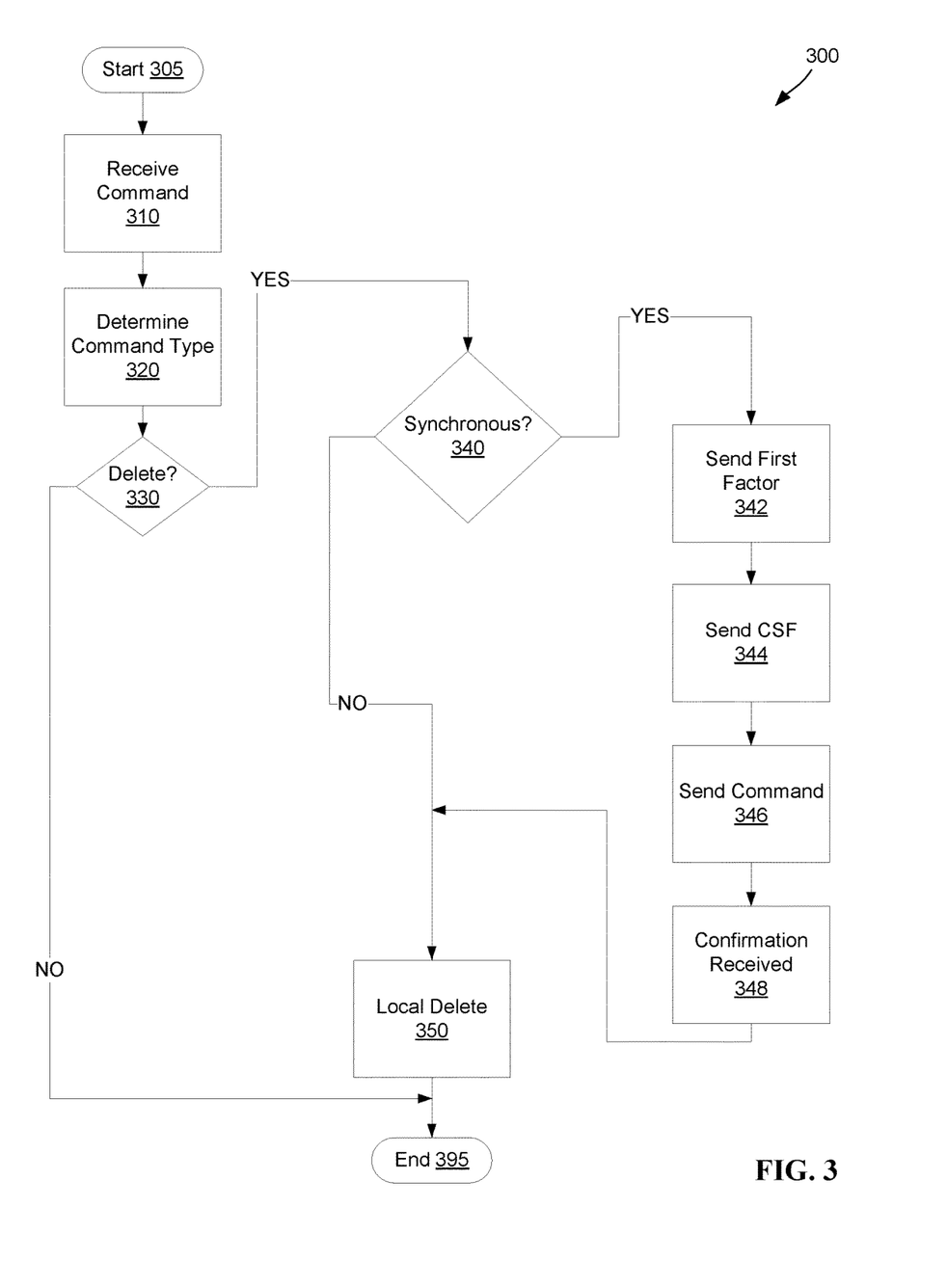
FIG. 3 is a flow diagram of a method for performing a delete in a synchronized file system based on the synchronized content, consistent with embodiments.

FIG. 3 is a flow diagram of a method 300 for performing a delete in a synchronized file system based on the synchronized content, consistent with embodiments. Method 300 may be performed by a filesystem server or data server in a file synchronization system. Method 300 may include more or less operations than is disclosed herein. Some operations may be performed continuously or periodically. For example, operations 310 may be performed, illustratively, every second, every three seconds, or every sixteen milliseconds. Some operations of method 300 may be combined or separated. As certain file synchronization systems may include a plurality of servers, some operations of method 300 may be performed by a first server and other operations may be performed by a second server. In some embodiments, method 300 may be performed in parallel by a plurality of servers of a file synchronization system. For illustrative purposes, method 300 will be described between a local filesystem and a remote filesystem, and the two filesystems are synchronized together.

At 310 one or more file system commands may be received. The file system commands may be received at 310 from a user of a computer (e.g., a user creating a new image file in a folder on a filesystem of the computer). The file system commands may be received at 310 based on an automated daemon or job. In some embodiments, the file system commands may be received based on an inotify framework. In some embodiments, the file system commands may be received based on a LWE framework. The file system command may be in the form of an API (e.g., get( ), put( ), delete( ), post( )). In some embodiments, the file system command may be in the form of a REST protocol (e.g., create( ), update( ), read( ), delete( )). The filesystem commands may be directed to a first content item on the local filesystem in synchronization with other synchronous file systems.

At 320 the type of file system command may be determined. The type of file system command may be determine at 320 based upon the type of protocol used to pass commands. For example, determining that the commands received at 320 are REST commands by comparing the received commands to a CURD model. If the file system command is not a delete, at 330, method 300 may end at 395. If the file system command is determined to be a delete command, at 330, the content item to be deleted is verified to be synchronous at 340. A synchronous item is one or more items of content in a filesystem that is synchronized with one or more additional file systems (e.g., a file backed up to a filesystem backup, a file tiered to a tiering filesystem, a cloud-synchronized file in a cloud-based file-storage service, etc.). An item may be verified synchronous at 340 by performing an inspection of the item identified by the command. In a first example, the item may be a remote item (e.g., object, container, metadata, domain, etc.) of a cloud-based tiering system. Continuing the first example, the tiered item may be in a tiering-storage format that is discernable by access to the local storage that is related to the tiered storage (e.g., a serialized name pointing to the local item). In a second example, the item may be a local item that has a tiered equivalent. Continuing the second example, the item may be in the format of a stub or short-form object that is of reduced size and that contains only a pointer to a corresponding tiered item. Continuing the second example, the stub may be direct (e.g., a pointer to the corresponding tiered item) or indirect (e.g., pointing to a database that contains information about the tiered item). The stub may include additional information, such as the last updated date of the stub or the corresponding synchronized content represented in the pointer of the stub. The command may be directed to an item stored on the local file system.

If an item is verified to be synchronous, at 340, a first authentication factor may be sent to a secondary filesystem at 342. The first authentication factor may be a primary authentication factor. In some embodiments, a primary authentication factor may be a factor utilized by one or more devices in a synchronized filesystem to gain access to the one or more devices. The first authentication factor may be a single piece of information, such as a password or passphrase. The first authentication factor may be multiple pieces of information, such as a username and password. The first authentication factor may be stored separately from the local filesystem (e.g., stored on an RSA key fob, stored in an authentication database, stored in a key server accessible only on a secure network, etc.). In some embodiments, the first authentication factor may be sent at 342 through a first transmission channel (e.g., a first network, a wireless network, a LAN, a Bluetooth™ personal area network, etc.). The first authentication factor may be sent at 342 to a server operating the remote filesystem.

After sending the first authentication factor at 342, a content-based secondary authentication factor (CSF) may be sent at 344. The CSF may be sent at 344 in response to a request from the recipient synchronization server that received the first authentication factor at 342. The sending of the CSF at 344 may be through a second transmission channel (e.g., a second network, a second wireless network, a separate LAN, a distinct personal area network, etc.).

As part of sending the CSF at 344, the CSF may be generated based on synchronous content contained in the local filesystem. In some embodiments, the CSF may be generated as a distinct operation from the sending of the CSF at 344. The content of the filesystem may be any attribute, descriptor, characteristic, value, or any other information relating to or describing a file, folder, metadata, or account. The content used to generate the CSF may be related to the account that the delete command is directed towards. In some embodiments, the content used to generate the CSF may be related to another account (e.g., an account of a second user that is also synchronized between a local filesystem and a remote filesystem). The content used to generate the CSF may be distinct from the first authentication factor (e.g., not a password, not a username, not a generated RSA key, etc.). The CSF may be an expression (also referred to as, linguistic expression) such as an interrogatory statement or a declarative statement. The generated CSF may be sent at 344 to the server operating the remote filesystem.

After sending the first authentication factor at 342 or the second authentication factor (i.e., the CSF) at 344, the delete command may be sent to the remote filesystem at 346. The delete command may be sent at 346 as part of the first authentication factor at 342. In some embodiments, the first authentication factor, the second authentication factor, and/or the delete command may be sent together. For example, sending the delete command may at 346 and sending the CSF at 344 may occur simultaneously. In some embodiments, the first authentication factor, the second authentication factor, and/or the delete command may be sent at 342, 344, and 346, as a single transmission.

An acknowledgement (also stated as, confirmation) may be received at 348. The acknowledgement may be received at 348 in response to receiving a confirmation that the first authentication factor sent at 342 was received. The acknowledgement may be received at 348 in response to receiving a confirmation that the CSF sent at 344 was received. The acknowledgement may be received at 348 in response to receiving a confirmation that the delete command sent at 346 was received. The acknowledgement may be generated by one or more servers or computers in connection with the remote filesystem. The acknowledgement may be received through the first transmission channel, the second transmission channel, or an additional transmission channel. In some embodiments, the acknowledgement received at 348 may indicate that the first authentication factor at 342 or the CSF 344 does not authenticate the delete command sent at 346.

At 350 the delete command may be performed on the local filesystem. The delete command may be performed at 350, after the sending of the various components to the remote file system at 342, 344, or 346, or acknowledgement 348. The delete command may be performed at 350 if the delete command is determined to not be directed to synchronous content 340. After the delete command at 350 is performed on the local filesystem, method 300 may end at 395.

FIG. 4 depicts the representative major components of an example computer system 401 that may be used, in accordance with embodiments of the present disclosure. It is appreciated that individual components may vary in complexity, number, type, and\or configuration. The particular examples disclosed are for example purposes only and are not necessarily the only such variations. The computer system 401 may comprise a processor 410, memory 420, an input/output interface (herein I/O or I/O interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or methods consistent with embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
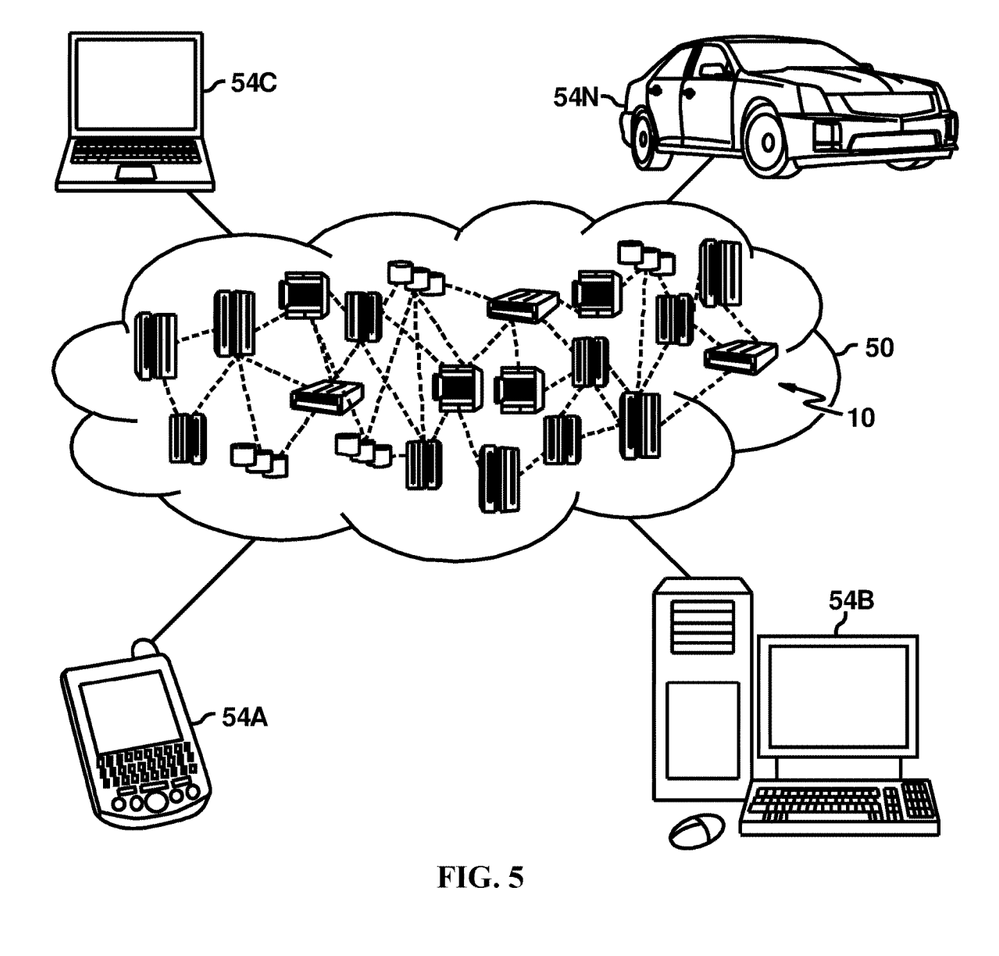
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 6:
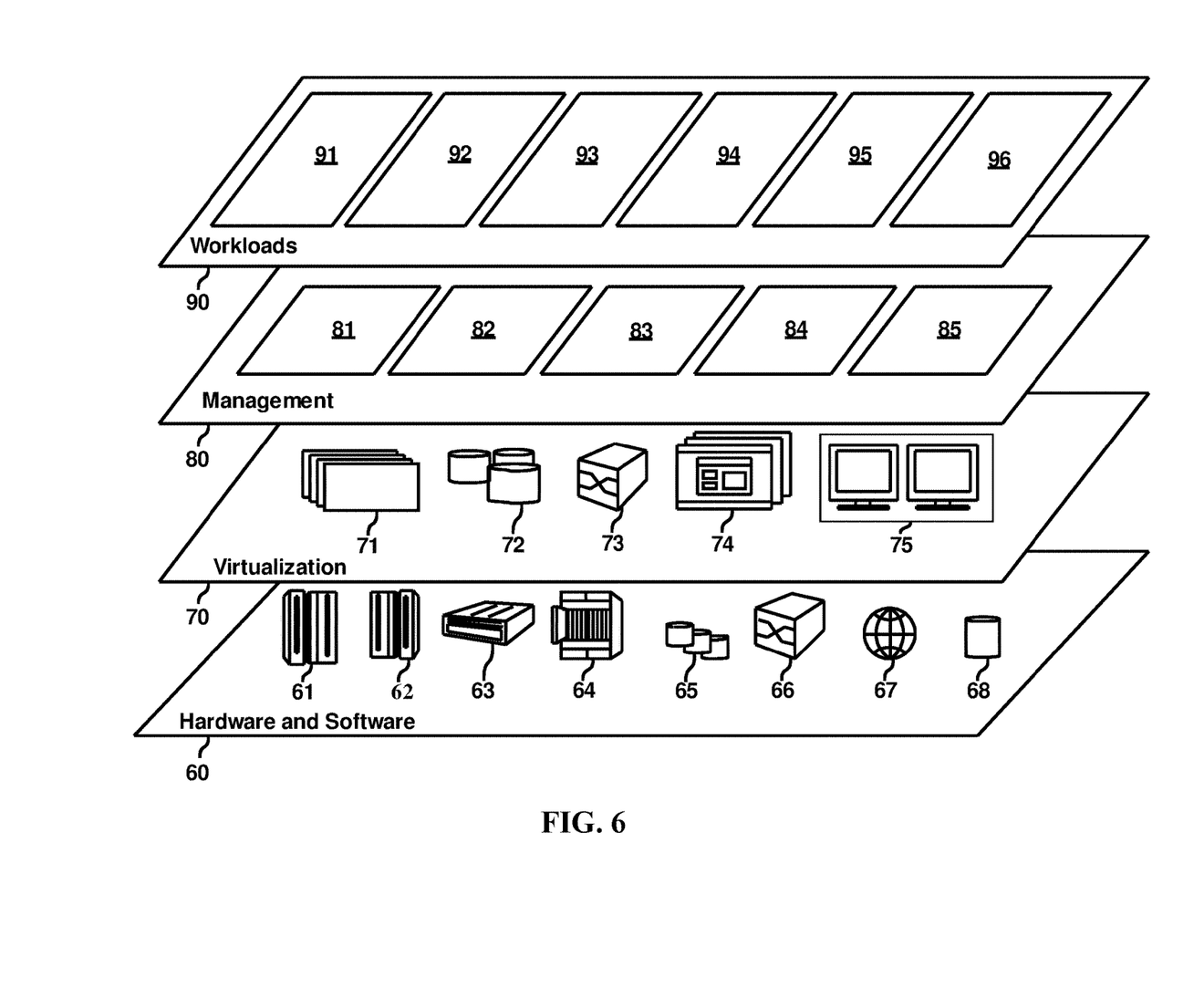
FIG. 6 depicts abstraction model layers according to an embodiment of the present invention.

Referring now to FIG. 6, a set of functional abstraction layers provided by cloud computing environment 50 (FIG. 1) is shown. It should be understood in advance that the components, layers, and functions shown in FIGS. 1, 2, and 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and security and authentication 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    sending, by a first processor and for synchronization by a second processor, a filesystem command directed to a second object of a second filesystem, the second object synchronized with a first object of a first filesystem; and
    sending, by the first processor and for authentication by the second processor, an expression to the second filesystem, the expression generated based on a third object of the first filesystem, the third object synchronized with a fourth object of the second filesystem.

2. The method of claim 1, wherein the synchronization of the third object with the fourth object of the second filesystem is based upon receiving an update to the third object, and wherein the fourth object synchronized with the third object of the first filesystem upon receiving an update to the fourth object.

3. The method of claim 1, wherein the expression is a secondary authentication factor, and wherein the method further comprises:
    sending, by the first processor and for authentication by the second processor, a primary authentication factor.

4. The method of claim 1, wherein the third object of the first filesystem is not a password.

5. The method of claim 1, wherein the third object of the first filesystem is an attribute that describes the number of files in a first folder of the first filesystem.

6. The method of claim 1, wherein the third object of the first filesystem is a metadata value.

7. The method of claim 1, wherein the method further comprises:
    searching the first filesystem for a third object, the third object other than the first object;
    detecting that the third object is synchronized with a fourth object of the second filesystem;
    determining an attribute of the third object; and
    generating a question related to the attribute and the third object, wherein the question resolves to true based on analysis by the second filesystem.

8. A tiering filesystem, the tiering filesystem comprising:
    a first memory;
    a first storage device, the first storage device containing a first filesystem of one or more first-filesystem objects;
    a first processor, the first processor communicatively coupled to the first memory and the first storage device, the first processor configured to:
        receive a first filesystem command;
        detect the first filesystem command is directed to a first object of the first filesystem synchronized with a second object of a second filesystem;
        retrieve, based on the detection, one or more authentication credentials;
        identify the first filesystem access command is a delete command;

generate, based on the identification, a linguistic expression related to the first filesystem; and provide to the second filesystem, the linguistic expression, the authentication credentials, and a second delete command to the second filesystem.

9. The tiering filesystem of claim 8, wherein the tiering filesystem further comprises:
a second memory;
a second storage device, the second storage device containing a second filesystem of one or more second filesystem objects synchronized with the first filesystem;
a second processor, the second processor communicatively coupled to the second memory and the second storage device, the second processor configured to:
receive the provided second delete command;
validate, based on the received second delete command, the second delete command based on the authentication credentials;
compare the linguistic expression to the second filesystem;
verify, based on the comparison, the second delete command; and
delete, based on the validated and verified delete command, the second object of the one or more second filesystem objects.

10. A system comprising:
a memory; and
a processor, the processor communicatively coupled to the memory, the processor configured to perform a method comprising:
sending, by a first processor and for synchronization by a second processor, a filesystem command directed to a second object of a second filesystem, the second object synchronized with a first object of a first filesystem; and
sending, by the first processor and for authentication by the second processor, an expression to the second filesystem, the expression generated based on a third object of the first filesystem, the third object synchronized with a fourth object of the second filesystem.

11. The system of claim 10, wherein the synchronization of the third object with the fourth object of the second filesystem is based upon receiving an update to the third object, and wherein the fourth object synchronized with the third object of the first filesystem upon receiving an update to the fourth object.

12. The system of claim 10, wherein the expression is a secondary authentication factor, and wherein the method further comprises:
sending, by the first processor and for authentication by the second processor, a primary authentication factor.

13. The system of claim 10, wherein the third object of the first filesystem is not a password.

14. The system of claim 10, wherein the third object of the first filesystem is an attribute that describes the number of files in a first folder of the first filesystem.

15. A computer program product comprising a computer readable storage medium having program instructions embodied therewith, the program instructions executable by a computer to cause the computer to:
send, by a first processor and for synchronization by a second processor, a filesystem command directed to a second object of a second filesystem, the second object synchronized with a first object of a first filesystem; and
send, by the first processor and for authentication by the second processor, an expression to the second filesystem, the expression generated based on a third object of the first filesystem, the third object synchronized with a fourth object of the second filesystem.

16. The computer program product of claim 15, wherein the synchronization of the third object with the fourth object of the second filesystem is based upon receiving an update to the third object, and wherein the fourth object synchronized with the third object of the first filesystem upon receiving an update to the fourth object.

17. The computer program product of claim 15, wherein the expression is a secondary authentication factor, and the program instructions are executable by the computer to further cause the computer to:
send, by the first processor and for authentication by the second processor, a primary authentication factor.

18. The computer program product of claim 15, wherein the third object of the first filesystem is not a password.

19. The computer program product of claim 15, wherein the third object of the first filesystem is an attribute that describes the number of files in a first folder of the first filesystem.

20. The computer program product of claim 15, wherein the third object of the first filesystem is a metadata value.

* * * * *